UNITED STATES PATENT OFFICE.

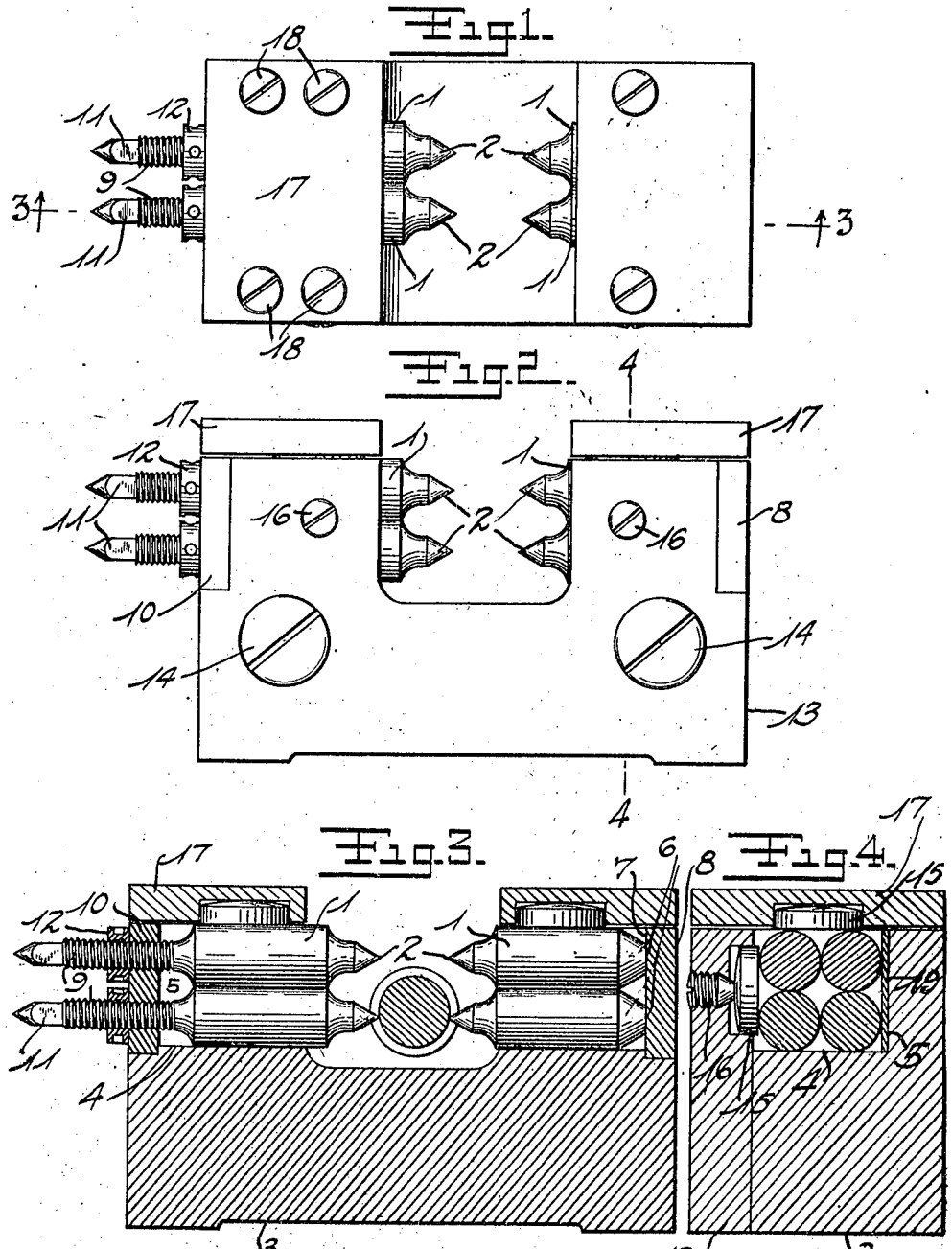

FRANK O. WELLS AND DICKERSON G. BAKER, OF GREENFIELD, MASSACHUSETTS, ASSIGNORS TO GREENFIELD TAP AND DIE CORPORATION, A CORPORATION OF MASSACHUSETTS.

THREAD-GAGE.

1,289,985.

Specification of Letters Patent.

Patented Dec. 31, 1918.

Application filed September 6, 1918. Serial No. 252,816.

*To all whom it may concern:*

Be it known that we, FRANK O. WELLS and DICKERSON G. BAKER, citizens of the United States of America, residing at Greenfield, Massachusetts, U. S. A., have invented new and useful Improvements in Thread-Gages, of which the following is a specification.

Our invention relates to gages for measuring the pitch diameter of screw threaded objects, and the pitch or lead and angle of the screw threads.

The primary object of the invention is to provide a gage composed of readily constructed parts which can be made by the use of simple ordinary toolmaking machinery to the required degree of accuracy without great skill on the part of the workman. An object of the invention is to provide a plurality of similar parts of such shape and dimensions that they need merely be clamped together in order to set the gage for certain measurements. A further object is to provide means for clamping said parts and effecting their adjustment to form a limit or tolerance gage to determine in a single operation whether the pitch diameter, pitch, and angle of a given thread are within predetermined limits.

The accompanying drawings illustrate a thread limit gage embodying the invention in a preferred form. In these drawings, in which similar reference characters designate corresponding parts in all views.

Figure 1 is a plan;

Fig. 2 is a side elevation;

Fig. 3 is a vertical longitudinal section taken approximately on the line 3—3 of Fig. 1; and Fig. 4 is a transverse section taken approximately on the line 4—4 of Fig. 2 looking in the direction of the arrow.

As shown in these drawings, the gage comprises a number of members each pointed at one end so as to enter between the teeth of the thread. These members 1 preferably have conically pointed ends 2, the angle of the cone being equal to the nominal angle of threads to be gaged.

The main body of each member is preferably formed with opposite surfaces, or the elements thereof, parallel, and parallel to the axis of the conical end, and with the distances between said parallel surfaces or elements a multiple of the nominal pitch of the threads to be gaged. These requirements are most readily conformed to by forming the body with a cylindrical outer surface coaxial with the conical end of the member as shown. Such a cylinder can be produced accurately to within one ten thousandth of an inch on a toolmaker's lathe.

When these members 1 are placed side by side with their axes parallel and their surfaces in contact, and the points of the conical ends in the same plane, by reason of the diameters of the members, the distances between the points are multiples of the pitch; and as the angle of the conical ends corresponds with the nominal angle of the thread, if a given thread has the proper angle and pitch and is held against these points, they will enter the thread fully; but an error in either the angle or the pitch will prevent the points from entering completely.

The limit gage shown comprises eight of the cylindrical members, 1, and means to clamp them in the desired positions including a base 3 having a right-angled groove extending longitudinally with flat surfaces 4 and 5 the one preferably horizontal and the other vertical. These surfaces are machined and scraped so as to be truly flat, and at right angles to each other. The cylindrical members are arranged, four resting on the horizontal surface, two of them abutting the vertical surface, and the other two resting against these members, two being disposed near each end of the base with their conical ends pointing centrally and extending into a gap provided in the base for the insertion of the pieces to be tested; and the other four members are arranged resting upon these members.

Preferably the four members arranged at one end of the base, hereinafter referred to as the fixed members, are of exactly the same length, and provided with flat surfaces 6 at their outer ends adapted to abut a flat surface 7 disposed at right angles to the surfaces of the groove of the base, and most conveniently provided by securing a plate 8 against a surface of the base scraped flat and at right angles to the surfaces of the groove. The members 1 resting against the surfaces 4, 5 and 7 and against one another then have the points of their conical ends all lying in the same transverse plane.

The four members 1 disposed at the other side of the gap in the base, which may be called the adjustable members, are provided with means for adjusting the distance from their conical ends to those of the fixed set to correspond with the pitch diameter of pieces to be tested. For this purpose the members 1 may be provided with screw-threaded extensions 9 adapted to pass through screw-threaded holes in a plate 10 secured at the end to the base 3. Means, such as the flattened portions 11, are provided for turning the cylinders so as to advance the points toward, or withdraw them from, those of the fixed set in order to set them at the desired distance. When the setting has been made, the cylinders may be locked in position by means of the capstan lock-nuts 12.

The members 1 having been set in the desired positions, they may be rigidly clamped in place horizontally by means of a side plate 13 secured to the base 3, as by screws 14, and disks 15 flat on one side and centrally raised on the other fitting recesses in the plate 13 and adapted to be pressed with their flat surfaces against the members 1 by means such as the screws 16, acting on the centrally raised portion so that the pressure is evenly transferred to the cylindrical members, holding them against the vertical abutment surface 5.

The members 1 may be clamped against the horizontal surface 4 by means of plates 17 having recesses fitted with disks 15 of the type described for transmitting pressure from the plates to the cylindrical members 1, these plates being secured to the base by means such as the screws 18, and resting themselves on the disks 15.

The device when set up as described and the points properly adjusted, would be suitable for testing double threads, or those in which the thread on one side is opposite a thread on the other; but in single threads, triple threads, and other threads where the lead is an odd multiple of the pitch, a thread on one side is opposite a groove on the other, and it is therefore necessary that the points at one end of the base be offset one half the pitch, or one half the pitch plus any convenient number of times the pitch. This adjustment may be conveniently and accurately effected by interposing a flat plate 19 of a thickness equal to the desired offset between the cylindrical members 1 at one end of the base and the vertical abutment surface 5 of the groove of the base.

To use the device as a limit gage for any given thread, the fixed members 1 are first set and clamped in place in the manner described, and the lower adjustable members are set at a distance corresponding to the lower limit for the pitch diameter from the lower fixed members, and locked in position with the capstan nuts; the upper members are then set similarly to correspond with the upper limit, and the adjustable members clamped in place. Work to be tested is held horizontally and at right angles to the axes of the cylindrical members, and if the combined errors in the angle of the thread, the diameter, and the pitch do not exceed the allowable amount, the work will pass between the upper set of four points, of its own weight, but will not pass the lower; if the piece is too large, it will not enter the upper set, and if too small, will pass between both sets, so that the device is used like an ordinary limit gage.

Having now described our invention, we claim and desire to secure by Letters Patent:

1. A thread gage comprising a plurality of cylindrical members having diameters a multiple of the pitch of a thread to be tested, and having pointed ends concentric with the axes, and means for clamping said members in sets with the cylindrical surfaces of the members of a set in contact.

2. A thread gage comprising a plurality of cylindrical members having diameters a multiple of the pitch of a thread to be tested, and having conically pointed ends concentric with the axes, the angle of the cone being equal to that of the thread, and means for clamping said members in sets with the cylindrical surfaces of the members of a set in contact.

3. A thread gage comprising a plurality of axially pointed cylindrical members, having diameters a multiple of the pitch of a thread to be tested, and means for clamping said members in a plane in opposed sets, the members of a set in contact, and with the points of one set offset from those of the other set $(n+\frac{1}{2})$ times the pitch, where $n$ is any convenient number, preferably zero.

4. A thread gage comprising a plurality of axially pointed cylindrical members, a base having a flat surface and a flat abutment surface at right angles thereto, and means for clamping said members against said surfaces and one another.

5. A thread gage comprising a base having a flat surface and a flat abutment surface at right angles thereto, and a flat end surface at right angles to said surfaces, a plurality of axially pointed cylindrical members disposed abutting said end surface and projecting toward the center of said base, means for clamping said members against said surfaces and one another, and adjustable pointed members arranged opposing said members, and offset to correspond with the pitch of the thread to be tested.

6. A thread gage comprising a base having a flat surface and a flat abutment surface at right angles thereto, axially pointed members, means for clamping said members, in sets with points opposed, against said surfaces, and a plate having a thickness equal to one half the pitch of a thread to be tested disposed between said abutment surface and one of said sets.

7. A thread limit or tolerance gage comprising a base having longitudinally extending surfaces at right angles to each other and a transverse gap in the central part, a plurality of axially pointed cylindrical members disposed in opposed sets on one of said surfaces projecting into the gap and forming the gage for one limit, a plurality of axially pointed members resting on said first-named members and forming the gage for the other limit, and means for clamping said members against said surfaces and one another.

8. A thread gage comprising a base having flat surfaces disposed at right angles, a plurality of axially pointed cylindrical members, disks having a flat surface adapted to rest against said members and the other surface centrally raised, and means for exerting pressure on the raised portions to hold said cylindrical members against the surfaces of the base.

In testimony whereof we have signed our names to this specification.

FRANK O. WELLS.
DICKERSON G. BAKER.